BEST AVAILABLE COPY T. D. Hoxsey BEST AVAILABI
Hoop Skirt.
№ 1655 Reissued Apr. 19, 1864.
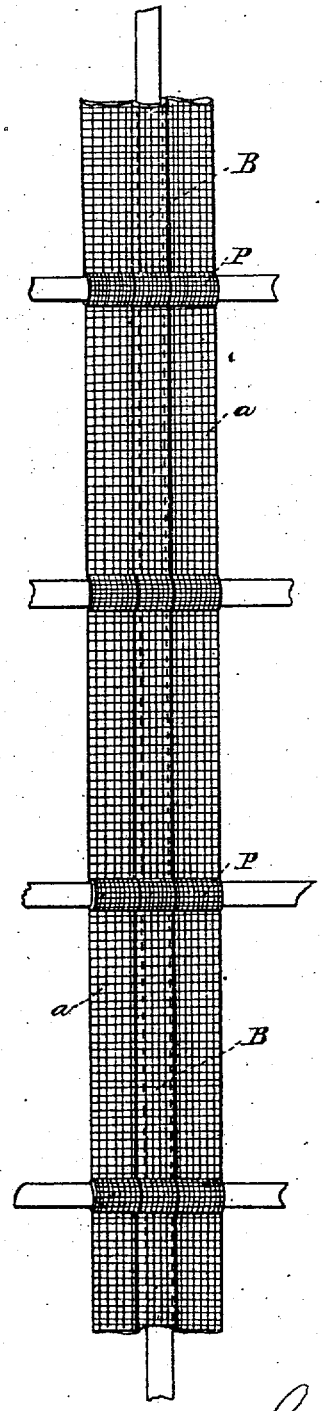
Witnesses
W. B. Crosby
W. Gould
Inventor
L. S. Seofield

UNITED STATES PATENT OFFICE.

SCOFIELD, OF BOSTON, MASSACHUSETTS, ASSIGNEE OF T. D. HOXSEY

IMPROVEMENT IN TAPE FOR SPRING-SKIRTS.

Specification forming part of Letters Patent No. 31,388, dated February 12, 1861; Reissue No. 1,655, dated April 19, 1864.

*To all whom it may concern:*

Be it known that THOMAS D. HOXSEY, of the city of Paterson, New Jersey, invented a new and valuable improvement or combination in making tapes for the manufacture of hoop or spring skirts; and I do hereby declare the following to be a full and exact description thereof, reference being had to the accompanying drawings, with the letters of reference marked thereon.

The said invention consists in weaving or constructing a sack or bag running lengthwise through the tape in combination with the ordinary transverse sacks or bags, now generally used, in making tapes for hoop or spring skirts. Such longitudinal pockets may be used for the reception of a rubber spring, running lengthwise through the bag of the tape, so that when manufactured into skirts such longitudinal spring shall answer the purpose of re-extending the skirt after it may have been collapsed or brought together by sitting, or otherwise. The longitudinal bag may be also employed for confining and protecting the vertical cords sometimes used in connection with the tapes for holding the hoops. The pocket B may be woven with any suitable number of warp and filling threads, and the filling-threads may be arranged in series with regular or irregular intervals between the successive series. The filling-threads may also be woven in so as to form the outside of the pocket without being crossed by the warp-threads.

By reference to the accompanying drawings, the letter A represents the tape.

B represents the longitudinal bag, running lengthwise through the tape with the spring.

P represents the transverse pockets or bags of said tape.

I disclaim any right to use a spiral metallic spring for the purposes aforesaid. I also disclaim any right to a patent for the mere manner of weaving the said tape.

I claim—

The combination of the longitudinal sack B, (made either as a continuous pocket or composed of a series of pockets or loops,) running lengthwise through the tape, with the transverse bags or pockets P.

L. S. SCOFIELD.

Witnesses:
J. B. CROSBY,
F. GOULD.